Figure 1:
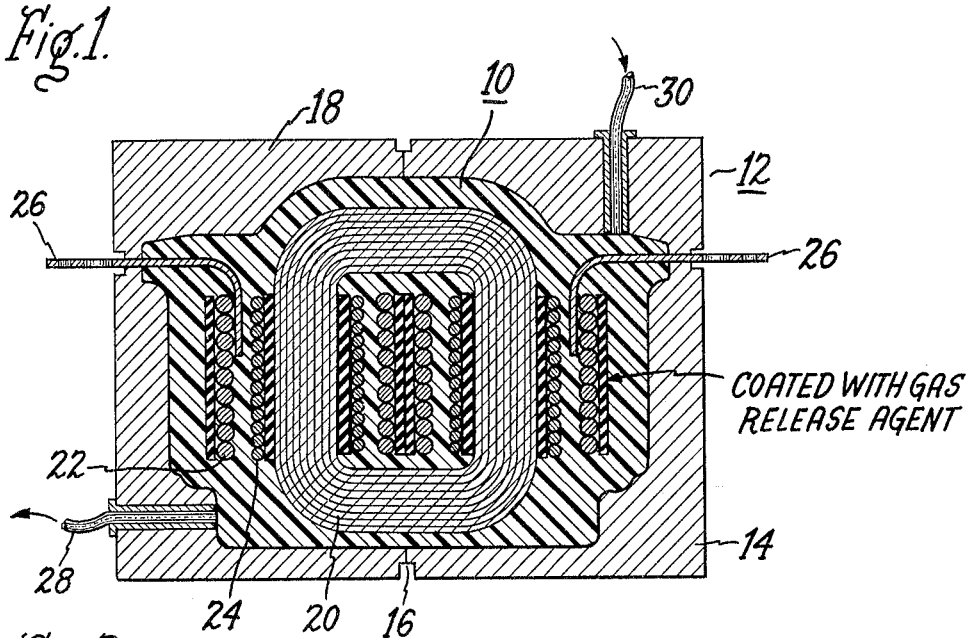

March 15, 1966  F. E. BURKE ETAL  3,240,848
METHOD OF MAKING ENCAPSULATED TRANSFORMERS
CONTAINING A DIELECTIC GAS
Filed March 14, 1962

Inventors,
Fred E. Burke,
Sheila M. Heffren,
by Francis K. Doyle
Their Attorney.

United States Patent Office 3,240,848
Patented Mar. 15, 1966

3,240,848
METHOD OF MAKING ENCAPSULATED TRANSFORMERS CONTAINING A DIELECTRIC GAS
Fred E. Burke and Sheila M. Heffren, Toronto, Ontario, Canada, assignors to Canadian General Electric Company, Limited, Toronto, Ontario, Canada, a company of Canada
Filed Mar. 14, 1962, Ser. No. 180,409
Claims priority, application Canada, July 11, 1961, 827,348
6 Claims. (Cl. 264—102)

The present invention relates to electrical devices encapsulated in insulating materials, and more particularly to electrical devices encapsulated in hardenable resinous materials in which residual voids inherent in the encapsulated device are filled with a gaseous dielectric medium. A method of filling such voids with the medium is provided by the invention.

The expression "encapsulated" as used hereinafter implies that an electrical device, such as a coil or transformer, is completely encased in a resinous or like material which preferably, but not necessarily, penetrates between the structural elements comprising the device so as to fill interstices inside the device.

The encapsulation of electrical devices such as coils and transformers in a polymerizable resinous material is well known in the art. It is advantageous to apply a liquid resin to the device under vacuum conditions to provide the best possible impregnation of the device by a resin of a given viscosity. Experience has shown that some unfilled interstices always remain inside the device after the resin has been cured to its solid or elastomeric state. There are three major causes for these unfilled interstices or voids:

(a) It is well known that vacuum treatment cannot remove all of the air trapped in the resin; for example, the high viscosity of the resin hinders its deaeration. Therefore, a certain degree of porosity of the resin will be unavoidable.

(b) Many circumstances well known in the art prevent penetration of the resin into all the crevices in the device.

(c) The difference in thermal properties of the combination of materials in an electrical device may lead to voids between the resin and the device.

At points in an encapsulated electrical device where voltage differences are great (e.g., between a winding and a core or between primary and secondary windings) voids at pressures less than atmospheric pressure are particularly objectionable. During vacuum treatment, the pressure inside the voids typically may be reduced to around $\frac{1}{500}$ atmosphere or lower and after encapsulation the pressure inside the residual voids may be in the order of $\frac{1}{3}$ atmosphere. This voided condition within the structure is detrimental to the electrical device in two ways. First, such voids will reduce and withstand voltage of the device and, second, such voids become areas of corona discharges. Corona discharges degrade the dielectric materials chemically and electrically and thereby lead to eventual failure of the materials. It is well known in the science of the conduction in gases, including conduction in gases in which corona arises, that for most sizes and shapes of voids the lower the gas pressure inside such voids the lower the corona starting voltage will be. As is well known this is in accordance with Paschen's law. Therefore, in an encapsulated electrical device corona will be observed at a much lower voltage in voids at a residual gas pressure of $\frac{1}{3}$ atmosphere than if the same voids contained a full atmosphere of gas pressure.

Accordingly, it is an object of the invention to provide a method of making electrical devices encapsulated under vacuum conditions in which residual voids in the structure have improved dielectric properties.

It is another object of the invention to provide a method of making encapsulated electrical devices having relatively high corona starting voltages.

In accordance with the invention, the improved device is obtained by incorporating in the device, prior to its encapsulation in a hardenable material under vacuum conditions an agent which, after the material has been at least partially hardened, can be activated to release an inert gas which fills residual voids in the encapsulated structure. In a preferred embodiment of the invention the device is encapsulated in a resinous material and the agent incorporated in the device is activated by heat at a temperature in excess of the temperature employed for curing the resin. The agent mentioned in this paragraph will be referred to also in the following pages as a "gas release agent."

It has already been established that voids are present in one form or another in electrical structures encapsulated in a resinous material, and if encapsulation took place under vacuum conditions, the rarified atmosphere in such voids exhibits dielectric properties which are very often responsible for electrical failures in high voltage devices, such as potential transformers. During our investigations of this problem, we came to the conclusion that the dielectric properties of voids could be improved substantially if the voids were filled with an inert, dielectric gas, such as nitrogen for example. As a result, we have discovered that a type of gas release agent can be incorporated in the structure of an electrical device, such as around the coils or between winding layers in current and potential transformers, and after an initial curing stage during which the resin has been transformed into the state of at least a gel, or the cure advanced beyond the gel stage, the gas release agent can be activated to release a gas which will flow into the voids in communication with the agent. In other words, any voids which are not sealed off from the agent will receive gas therefrom. It is important that the initial cure must have advanced to the point where the resin is in a sufficiently solid state to confine the gas to the voids without expanding them. If the cure is not advanced sufficiently, the build-up of pressure by the gas as it is being released by the agent may force gas bubbles through the resin and thereby convert the resin into a spongy mass. In order to ensure that the maximum number of voids in the vicinity of the vital areas in the structure will be filled with gas, the agent is well distributed in these areas. Preferably, the means we propose for releasing gas from the agent is by heat at a temperature above the temperature necessary for the initial or so-called "gel cure" of the resin. Conveniently, the temperature at which was release occurs may be the temperature at which subsequent or final cure of the resin takes place, thus combining the gas release cycle with a resin curing stage.

In the selection of a material which will release a suitable dielectric gas under controlled conditions, it was necessary to consider a number of factors. First of all the material itself must not chemically attack the materials in the electrical structure, and its decomposition must liberate an inert, stable, dielectric gas which will not chemically attack any of the materials in the electrical structure with which it comes into contact. Furthermore, the products formed by decomposition of the agent must not attack or be otherwise detrimental to the electrical structure, that is, they must be nonconductors of dielectric properties commensurate with the dielectric properties of the insulation used in the structure, and they must be chemically stable. By-products such as water, ammonia and the like are objectionable. If the dielectric gas is to be liberated from the agent by means of heat, this should occur within a reliable and relatively narrow temperature range in order that no gas be released until a definite temperature is reached, after which the gas should be liberated freely by a further, relatively small, elevation of temperature. The temperature at which the agent decomposes to release a gas should not change materially due to variations of the gas pressure inside the encapsulated structure. For the best results, the temperature at which the gas begins to be released from the agent should be slightly above the upper limit of the range employed to solidify the resin to the state where it is strong enough to contain the gas in the voids, and the upper limit of the temperature range necessary for complete liberation of the gas should be well below the temperature at which deterioration of the resin sets in.

A preferred material well suited for use as a gas release agent is "cyclohexanoic dinitrile" which is generally known as CHDN and will be referred to as such hereinafter. The specific embodiment of the invention to be described will specify CHDN as the gas release material preferred. An example of another suitable material is "azo isobutyric dinitrile" which is generally known as AZDN. Both materials perform well but CHDN is preferred over AZDN because its gas release temperature range is a little higher than that of AZDN thus allowing for a drying cycle of the device at a convenient temperature prior to vacuum treatment and impregnation. Other materials suitable for particular applications will readily occur to those skilled in the art.

One satisfactory way of incorporating the gas release agent in an electrical structure is to apply the agent to the insulation layers before the insulation is incorporated in the structure, such as to the strips of insulation interposed between winding layers in a potential transformer or the insulation used for wrapping current transformer coils. This provides reasonable dispersal of the agent within the winding. In the practice of the invention on epoxy encapsulated potenial transformers, a light concentration of CHDN is applied as a central band along the length of a strip of insulation before the insulation is used in the transformer during the winding thereof.

A mixture found suitable for coating the surface of insulating materials such as kraft paper consisted of 1%, weight by volume, AZDN in denatured alcohol or a slightly higher concentration of CHDN in alcohol. This solution can be painted on the insulation, after which the alcohol is evaporated, leaving a thin layer of powder deposited on the surface of the insulation. Although this method produces satisfactory results, it is not recommended because some of the powder may dust off into the air during the handling of the treated insulation and be inhaled by the operators. Therefore, we much prefer to mix the powder with a vehicle which will hold a light dispersion of the powder on the insulation without interfering with either the gas retaining or gas releasing properties of the agent. A coumarone-indene resin has a low film rupture strength, a melting point in the range of the gas release temperature of CHDN (120° C.), and is tack-free when used in small quantities. In order to obtain a thin film of the resin for bonding the agent to the surface of the insulation, the resin can be incorporated into a solution containing about 2%, weight by volume, AZDN and about 5%, weight by volume, resin in xylene. When CHDN is used as the gas release agent, the concentration of agent is increased slightly to about 3% CHDN and about 5% resin in xylene. The solution can be applied to the strip of insulation as it is unrolled from one roll and re-rolled into another roll, after which the roll of treated insulation can be dried for the necessary time at a temperature elevated to a maximum of 20° C. below the temperature at which gas release begins, e.g. 50° C. for about 2 hours.

Since the amount of gas available from a given amount of agent can be readily calculated, it is possible to approximate the quantity of agent required for a particular application. This approximation may be based on an assumed volume of void space to be filled with gas to a pressure substantially equal to atmospheric pressure. Because the void space is an assumed volume, we prefer to include a little excess of agent and thereby make sufficient gas available for a slight initial build-up of pressure in the voids in direct communication with the agent, which pressure build-up gradually returns to near atmospheric pressure as the surplus gas seeps into the less accessible voids.

In the case of insulating materials which are less porous than kraft paper, it is advantageous to increase the concentration of CHDN in the resin-xylene solution because less solution will adhere to the smoother surface. Of course, the same results are possible by increasing the width of the strip covered rather than increasing the solution concentration. However, it is possible that under certain conditions a gas release agent may act as a catalyst to the resin cure and as a result we prefer to keep the strip to a minium width to avoid contact between the resin and the agent. Epoxy varnished glass cloth is an example of a material on which we apply the solution of greater concentration of CHDN. In some instances it may be desirable to coat a portion on both sides of the insulation, or to apply several successive coats.

In the manufacture of an electrical device, such as a potential transformer, the treated insulation is applied in the conventional way during the manufacturing process. The completed transformer is then placed in a suitable mould, and the assembly of mould and transformer dried at a temperature well below the gas release temperature. The assembly is subjected to vacuum treatment to remove the air from within the transformer and mould, and while the assembly is still under vacuum the mould is filled with liquid resin. Evacuation of the air from the transformer may be accomplished by placing the mould and transformer in a vacuum tank and while under vacuum the resin may be pumped into the mould after evacuation therefrom of all the air. Both the equipment and the process employed to evacuate the air and apply the resin are well known in the art, hence a full description of this equipment and process is believed to be unnecessary. After impregnation, the mould containing the resin impregnated transformer is heated to a temperature below the gas release temperature for a period of time sufficient to harden the resin to at least its so-called "gel state," at which point the resin is hard and strong enough to contain the low pressure gas to be liberated from the agent into the voids inside the encapsulated transformer. Activation of the agent may take place in one of the post cure cycles. The release of gas and post cure of the resin may follow the precedure outlined previously.

Figure 2:
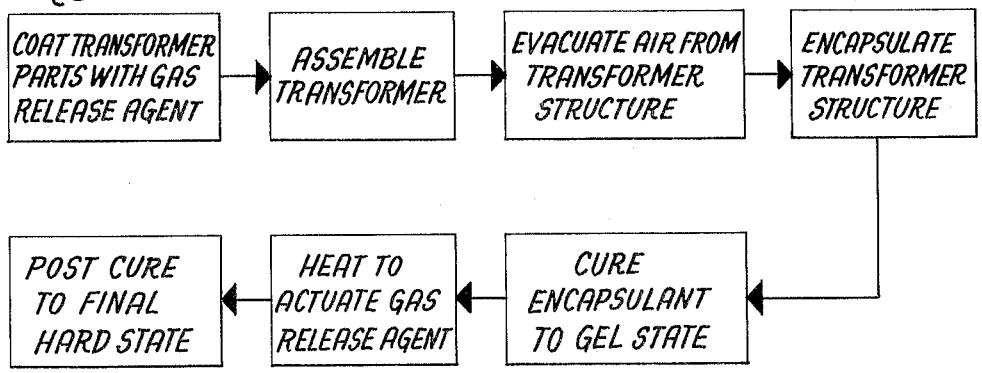

One form of the invention is shown in the accompanying drawing, in which:

FIGURE 1 is a sectional view of one method of encapsulating a transformer incorporating this invention; and FIGURE 2 is a flow diagram of a preferred method of carrying out this invention.

In FIGURE 1, an encapsulated transformer 10 is shown in an encapsulating form or mould 12. The mould 12 comprises a lower member 14 whose interior is in the shape desired of the final transformer. Lower member 14 may be in two parts, if desired, as indicated by notch 16. The top member 18 of the encapsulating form 12 has an interior formed in the shape of the upper portion of transformer 10, as shown. Members 14 and 18 are assembled together with the core and coil structure of the transformer centered within the interior of the encapsulaitng form 12. As shown in FIG. 1, a core and coil structure comprising a core 20, primary winding 22 and secondary winding 24 may be suspended within the encapsulating form 12 by means of the primary terminals 26 which fit between the upper and lower portions 14 and 18 of the form 12 in the manner shown. After the core and coil unit has been centered in the encapsulating form 12 a vacuum pump (not shown), connected to the tube 28, is used to evacuate substantially all the air from the interior of the encapsulating form 12. As is understood, this will remove substantially all the air from all of the interstices of the core and coil unit. After evacuation, the encapsulating material may be fed into the interior of the encapsulating form 12 through the tube member 30. This, of course, may be done while a vacuum is still being pulled on the interior of the encapsulating form 12 to aid the encapsulating material in completely surrounding the core and coil unit and filling the interstices in such core and coil unit. Of course, it will be understood that various portions of the structure of the transformer 10 will have been coated with a gas release agent, such as indicated by the legend in FIG. 1. After the encapsulating material has completely filled the interior of the encapsulating form 12 the encapsulant may be cured at room temperature, or the entire form 12 may be raised to a temperature below the temperature at which the gas release agent is activated, to provide a first cure of the encapsulant. As noted, this first cure is the "gel state" of the encapsulant, in which the encapsulant is strong enough to contain the gas which is to be liberated from the gas release agent. After obtaining its first cure, the encapsulated transformer 10 may then be removed from the encapsulating form 12 for subsequent curing or it may be finally cured within the encapsulating form 12. As was earlier pointed out, the gas release agent may be activated when the transformer 10 is raised to the proper temperature to obtain the final cure of the encapsulating material.

FIGURE 2 is a flow diagram of one method of carrying out this invention. As is shown in FIG. 2, certain parts of the transformer are coated with a gas release agent and then the transformer is asssembled using these coated parts. The transformer may then be placed into an encapsulating member, such as form 12 of FIG. 1, and a vacuum pump may be used to evacuate the air from the transformer structure and the interior of the encapsulating form. After evacuation, the encapsulating material is injected into the encapsulating form so as to completely encapsulate the transformer structure. The encapsulating material may then be cured to its gel state. This may be done either by allowing the material to set in the encapsulating form for a sufficient period at room temperature, or the encapsulating form may be raised to a desirable curing temperature, which is less than the temperature at which the gas release agent is activated. When the encapsulant has been cured to its gel state, such that it is hard and strong enough to contain the gas which may be liberated from the gas release agent, the transformer may then be heated to a sufficient temperature to activate the gas release agent. As earlier mentioned, it is desirable that the heat necessary to actuate the gas release agent will also be the temperature for obtaining the final cure or post cure of the encapsulant to its final hard state. Therefore, both the actuation of the gas release agent and the final curing of the encapsulant may advantageously occur at the same temperature.

The following examples are included to illustrate the novel aspects of the invention and are not intended to limit its scope in any way.

EXAMPLE 1

Two potential transformers, unit #1 and #2, were built in the laboratory and encapsulated in epoxy resin. Five grams of a mixture of 5%, by weight, AZDN in talc was applied to a 4½ inches wide strip of semi-cured epoxy varnished glass cloth, the dry powder being applied in a thin layer about ¾ inch wide along the mid portion of the strip. The strip of insulation was then wrapped around the transformer coils into a plurality of layers enclosing the coils, of which all but the inner layer and the outermost three layers were coated with the powder mixture. In order to ensure no release of gas, the transformer was not dried by means of heat prior to encapsulation. After encapsulation, both units were cured at room temperature for 12 hours (gel cure). The two units were tested for corona starting voltage and corona extinction voltage between various stages of heat treatment of the resin.

| Unit | Corona Starting Voltage (kv.) | Corona Extinction Voltage (kv.) |
|---|---|---|
| A. Room Temperature for 12 hours: | | |
| 1 | 6.5 | 4 |
| 2 | 7 | 5 |
| B. Post cured at 100° C. for 12 hours (theoretically gas-released at 90–100° C.): | | |
| 1 | 7.5 | 5 |
| 2 | 9 | 6 |
| C. Cured 130° C. for 12 hours, cooled for 6 hours: | | |
| 1 | 13 | 11.8 |
| 2 | 16.5 | 14 |
| D. Cured at 130° C. for another 12 hours—tested at 130° C.: | | |
| 1 | 15 | 14.8 |
| 2 | 25.5 | 24 |
| E. As in D—tested at room temperature about 6 hours later: | | |
| 1 | 12.5 | 9.8 |
| 2 | 12.5 | 10 |
| F. As in E—after 12 hours at room temperature: | | |
| 1 | 12.2 | 9.5 |
| 2 | 12 | 10 |
| G. Cured 16 hours at 130° C.—tested at 130° C.: | | |
| 1 | 11.8 | 9.2 |
| 2 | 10.6 | 9.5 |
| H. As in G—no change at room temperature 6 hours later | | |
| I. 1 | Life tested at 40 kv.—in excess of 1 hour and 30 minutes. | |
| 2 | Life tested at 50 kv.—30 minutes to failure. | |

The figures recorded under A represent normal corona behaviour for transformers of the general type tested when such transformers contain the same insulation as used in the test transformer. Therefore, the introduction of a mixture of AZDN and talc into the insulation did not produce significant changes in the corona characteristics of the transformer.

The figures recorded under B to D show a continuous increase of corona starting and corona extinction voltages, which increase can be accounted for by the gradual diffusion of gas into vacuum voids. It is not certain that a continuous evolution of gas took place during this period, but a progressive filling of the corona sensitive voids did appear to take place.

The figures recorded under E to H show that an excess pressure, i.e., a pressure above atmospheric, was typical at Stage D and that upon the release of this excess by diffusion, the corona starting voltage was stable during both a rise of temperature and temperature cycling.

The AZDN (azo isobutyric dinitrile) used in Example 1 had a minimum purity of 97%, a decomposition range of 90 to 100° C. and released 135 millilitres of nitrogen per gram of compound at N.T.P. This material is not pressure inhibited and leaves a residue of tetra-methyl succino dinitrile which is toxic. However, since the residue is encapsulated with the transformer, it is not considered to be hazardous. It is to be noted that the measurements made on the transformers were of electrical improvements rather than measurements of gas volume and pressure.

EXAMPLE 2

Two potential transformers, unit #3 and #4, were insulated in the same way as the transformers in Example 1 except that a composite kraft paper-acetate-kraft paper strip was used as the major insulation in place of the epoxy-glass cloth insulation. One side of the strip was painted along its center with a solution of denatured alcohol containing 1%, weight by volume, AZDN such that about 0.25 gram of AZDN is contained on 110 feet of insulation. The treated strip was rolled up and the roll dried at 50° C. for 12 hours. After assembly, the core and coil unit was placed in a mould and the mould and transformer were heated to 80° C. for 20 minutes, after which vacuum was applied to exhaust the air from the mould, followed by filling the mould with epoxy resin to impregnate the transformer. The resin was given an initial cure by placing the mould in a bath of water at a temperature of about 95° C. for 3½ hours and a final cure at 100° C. for 10 hours.

Both transformers were impulse tested and passed 110 kv. Both units withstood 25 kv. more than standard for similar units produced at that time.

No corona tests were done on units #3 and #4.

EXAMPLE 3

Four more potential transformers, unit #5 to #8, were insulated with the same material and in the same way as the transformers in Example 2. However, the AZDN was replaced with CHDN of the same solution concentration, paper treatment and drying cycle. In other words, transformers 5 to 8 were prepared in exactly the same way as transformers 3 and 4 with the former containing CHDN as the gassing agent and the latter AZDN.

After assembly, the transformers were placed in a mould and dried for 10 hours at 100° C. This is well below the gas release temperature of around 120° C. for CHDN. The vacuum treatment followed by encapsulation in liquid epoxy resin was by conventional means. Again, a water bath at about 95° C. was employed for an initial 3½ hour curing cycle, after which all four transformers were subjected to a second cure at 100° C. for 10 hours. Units 5 and 6 were finally cured at 130° C. for 16 hours while units 7 and 8 were given their final cure at 135° C. for 16 hours. Since the gas release temperature of CHDN is around 120° C., the liberation of nitrogen gas from the CHDN would take place during the final curing stages of 130° C. and 135° C. respectively.

In the electrical tests recorded below, more than one set of readings was sometimes taken, i.e. shown as (a), (b), and (c). During electrical testing of each transformer, the voltage applied thereto was gradually increased, corona intensity readings were taken with an events-per-unit-time timer at 5 kv. intervals, and the corona starting voltage noted.

The corona extinction voltage was noted on the decreasing voltage. If there was any question about the reliability of the corona starting and extinction voltages in the first set of readings, the test was immediately repeated a second or even a third time [(b) and (c)]. The first corona readings may sometimes be abnormal and subsequent tests may be necessary before consistent readings are obtained.

The following table gives the test result on the four potential transformers. All the tests on units 5 and 6 were conducted after the final cure at 130° C., while units 7 and 8 were tested before and after the final cure at 135° C.

| Test No. | Unit | Corona Starting Voltage | Count At— | | | | Corona Extinction Voltage | Remarks |
|---|---|---|---|---|---|---|---|---|
| | | | 5 kv. | 10 kv. | 15 kv. | 20 kv. | | |
| 1(a) | 5 | 14.5 | | | | 2 | 8.2 | Tested after post cure at 130° C. |
| 1(b) | 5 | 12.5 | | | | 2 | 8.2 | |
| 2(a) | 6 | 25.0 | | | | | 5.5 | Tested after post cure at 130° C. |
| 2(b) | 6 | 15.0 | | | 8 | 8 | 5.5 | |
| 2(c) | 6 | 7.0 | | 8 | 8 | 8 | 5.5 | |
| 3(a) | 7 | 11.5 | | | 1-2 | 5 | 2.5 | Tested before post cure at 135° C. |
| 3(b) | 7 | 3.5 | | 2 | 1-2 | 5 | 2.5 | |
| 3(c) | 7 | 2.8 | | 2 | 1-2 | 5 | 2.5 | |
| 4(a) | 8 | 17.5 | | | | 1-2 | 1.0 | Tested before post cure at 135° C. |
| 4(b) | 8 | 3.25 | | 1-2 | 1 | 1-2 | 1.0 | |
| 4(c) | 8 | 2.25 | | 1-2 | 1 | 1-2 | 1.0 | |
| 5 | 7 | 2.5 | 1 v. | 3 v. | 15 v. | | 2.0 | Tested with oscilloscope before post cure at 135° C. |
| 6 | 8 | 1.5 | 6 v. | 6 v. | 10 v. | | (−)1 | |
| 7 | 7 | 2.5 | 40 | 55 | 34 | | 2.0 | Tested with counter before post cure at 135° C. |
| 8 | 8 | 2.5 | 40 | 40 | 20 | | (−)1 | |
| 9(a) | 7 | 14.5 | | | 2-3 | 45 | 10 | |
| 9(b) | 7 | 15.2 | | | 2-3 | 45 | 10 | |
| 9(c) | 7 | 15.2 | | | 2-3 | 45 | 10 | Tested with counter after post cure at 135° C. |
| 10(a) | 8 | 12.0 | | | 30 | 45 | 10.5 | |
| 10(b) | 8 | 11.25 | | | 30 | 45 | 10.5 | |
| 10(c) | 8 | 11.5 | | | 30 | 45 | 10.5 | |

Impulse Tests:
 Unit 5—Passed 140 kv.
 Unit 6—Passed 120 kv.
 Unit 7—Passed 95 kv.
 Unit 8—No impulse test, passed hi-pot.

Corona tests numbers 1 to 8 were completed before the post cure and tests numbers 9 and 10 were completed after post cure. A significant increase in corona starting and extinction voltages are noted. The phenomenon of consecutive decreasing voltages of (a), (b), and (c) in tests 2, 3 and 4 may be explained as follows: corona was present at these higher voltages but the corona intensity was below the detection level of the counter used to measure it. Consecutive applications of voltage increased the CSV and the actual CSV was measured, the CSV being considered reliable when the CSV–CEV spread was 5 kv. or less.

Impulse test results confirm improvements found in Example #2.

EXAMPLE 4

Six current transformers were insulated with semicured epoxy coated glass cloth, the cloth strip being wrapped around the transformer coils into a plurality of layers enclosing the coils as in Example 1. Prior to wrapping, the ribbon of epoxy-glass cloth had a central strip on both sides thereof coated with a solution containing, weight by volume, 3% CHDN, 5% coumarone indene resin and the balance a technical grade of xylene. The coating was carried out by unrolling the ribbon from one roll, treating it with the CHDN solution, rerolling it into a second roll, and finally drying the treated roll at 50° C. for two hours. Following vacuum impregnation with epoxy resin, the transformers were cured at 95° C., 100° C., and 135° C. for 3½, 10 and 16 hours respectively as were units 7 and 8 in Example 3. Each transformer was tested prior to the 135° C. post cure for 16 hours, and also after this cure, the first row of figures in each horizontal column in the following table being the readings taken before the 135° C. post cure and the second row of figures in these columns being the readings taken after the 135° C. post cure. Corona intensities were measured by means of an oscilloscope. In the following table corona starting voltage is abbreviated C.S.V. and corona extinction voltage C.E.V.

*Corona intensities—volts*

| Transformer Serial No. | C.S.V., k.v. | At Start | 10 kv. | 15 kv. | 20 kv. | C.E.V., kv. |
|---|---|---|---|---|---|---|
| 412042 | 7 | .5 | .75 | 5 | 100 | 4.5 |
|  | 14 | .15 |  | .15 | .5 | 9.5 |
|  | 6.5 | .3 | 50 |  |  | 5 |
| 412058 | 12 | .02 |  | .2 |  | 11 |
| 412045 | 10 | .6 |  | 3 | 5 | 7 |
|  | 13 | .15 |  | .3 | 2 | 10 |
| 412046 | 6 | 7.5 | 20 |  |  | 5.5 |
|  | 13 | .2 |  | .3 | 15 | 10 |
| 412056 | 7 | 20 | 30 |  |  | 6.5 |
|  | 10.5 | 5 |  | 15 |  | 5.5 |
| 412059 | 9 | 7 | 50 |  |  | 7.3 |
|  | 14 | .2 |  | .3 | 75 | 9 |

In this example the liberation of nitrogen gas from the CHDN raised the corona starting voltage between 30% and 116% and greatly reduced corona intensities.

It is evident from the examples that the dielectric properties of the voids in an encapsulated device can be improved considerably in respect to corona by filling such voids with an inert, dielectric gas. The agents and gases are not limited to those given herein by way of example. Other inert, dielectric gases and gas release agents of suitable properties will readily occur to those skilled in the art.

Epoxy, epoxide or ethoxyline resins, as they are variously called, are well known in the art. Generally, such epoxy resins comprise a polyether derivative of a polyhydric organic compound, said derivative containing 1,2 epoxy groups, the compound being selected from the class consisting of polyhydric alcohols and phenols containing at least two phenolic hydroxy groups. For example, United States Patent 2,324,483, dated July 23, 1943, to Castan discloses epoxy resin compositions comprising the reaction product of phenols having at least two phenolic hydroxy groups and an epihalogenohydrin such as epichlorohydrin, the product having at least two epoxy groups and being cured to a thermoset, infusible mass by the use of a carboxylic or polybasis acid or acid anhydride such as phthalic anhydrides. Other acid type curing agents for epoxy resin include hexachloro-endomethylene-tetrahydrophthalic anhydride, maleic anhydride and pyromellitic dianhydride. The use of organic nitrogen base or amine type materials to cure epoxy resins is also well known as set forth, for example, in United States Patent 2,444,333, dated June 29, 1948, such materials often giving a rapid cure at room temperature. The use of boron trifluorideamine complex materials as epoxy resin curing agents is also well known as disclosed, for example, in United States Patent 2,717,885, dated September 13, 1955. United States Patents 2,494,295, January 10, 1950; 2,500,600, March 14, 1950; and 2,511,913, June 20, 1950, describe further ethoxyline resins. Although the experiments recorded above have been directed to the use of epoxy resin as the encapsulating medium, we believe that it is obvious to those skilled in the art that other resins, such as phenolics, polyesters, etc., are also suitable for use in the practice of our invention.

The resinous material used to encapsulate a device may be introduced into the mould as a viscous liquid and while in the mould polymerized into a solid, elastic mass which envelops the device. Preferably polymerization of the resin is accelerated through the use of a catalyst and heat. It is also within the scope of this invention to encapsulate a device in polymerizable materials which are not viscous liquids when introduced into the mould. However, such other materials must be capable of plastic flow when introduced into the mould so that it will flow around the device. An extrusion process, employing heat to soften the material if necessary, is well suited for filling the mould with these non-liquid materials. To ensure that no air is trapped in the encapsulated device, vacuum is often applied to the mould for a period of time prior to the introduction of the encapsulating material into the mould and during the time that the material is being injected into the mould. Butyl rubber is one of a number of non-liquid polymerizable materials which is used extensively for the encapsulation of current and potential transformers. As with a liquid resin, these other materials must be cured to a sufficiently solid state to contain the gas liberated from the gas release agent before the agent is activated to liberate its gas. When a transformer is encapsulated in a material such as butyl rubber, vacuum is used to aid the process of impregnation. Voids containing gas at reduced pressure may be rendered less troublesome by the application of agents similar to those described above, and appropriately released.

While tests were made on potential and current transformers, it will be obvious to those skilled in this art, that the utility of this invention is not limited to any type of encapsulated transformer. It will be readily apparent that this invention will be useful in all types of encapsulated transformers, including, without limitation, distribution transformers, power transformers, current transformers and potential transformers. Therefore, it will be understood that the claims appended hereto are intended to cover all types of encapsulated transformers, and are not limited to transformers described in the specification.

What is claimed as new and which it is desired to secure by Letters Patent of the United States is:

1. The method of treating an electrical transformer structure comprising (1) incorporating a chemically inert, dielectric gas release agent within said structure, (2) evacuating the air from the interstices within said structure, (3) encapsulating said structure in a resinous material, (4) curing said resinous material to its gel state and (5) thereafter heating the encapsulated structure to activate said gas release agent for release of a dielectric gas to be contained in residual voids in said structure.

2. The method of treating an electrical transformer structure comprising (1) incorporating a chemically inert, dielectric gas release agent in said structure, (2) evacuating the air from the interstices within said structure, (3) encapsulating said structure in a resinous material, (4) heating said encapsulated structure to a first temperature to cure said resinous material to its gel state and (5) thereafter heating said encapsulated structure to a second temperature higher than said first temperature to activate said agent to release gas to fill interstices in the encapsulated structure.

3. The method of treating an electromagnetic structure comprising (1) incorporating a chemically inert, dielectric gas release agent in the coils of said structure during the winding of said coils, (2) evacuating the air from the interstices within said structure, (3) immersing said structure in a liquid resinous material under vacuum, (4) applying pressure to said material while said structure is immersed to fill said interstices with resin, (5) heating the resin impregnated structure to a first temperature range to cure said resinous material to its gel state and (6) thereafter heating said resin impregnated structure to a second temperature range higher than said first temperature range to activate said agent to release gas to fill said interstices in the encapsulated structure.

4. The method of claim 1, including the further step of further heating the encapsulated structure to post cure said resinous material to its final hard state.

5. The method of claim 2 including the further step of maintaining said second temperature to post cure said resinous material to its final hard state.

6. The method of claim 3 including the further step of maintaining said second temperature to post cure said resinous material to its final hard state.

(References on following page)

References Cited by the Examiner

UNITED STATES PATENTS

| | | | |
|---|---|---|---|
| 1,427,324 | 8/1922 | Priestley | 18—59 |
| 1,952,158 | 3/1934 | Clark et al. | 336—96 |
| 2,185,831 | 1/1940 | Camilli | 336—96 |
| 2,385,460 | 9/1945 | Omansky | 18—59 |
| 2,893,061 | 7/1959 | Terry | 264—272 |

FOREIGN PATENTS 853,941   11/1960   Great Britain.

ROBERT F. WHITE, *Primary Examiner.*

JOHN F. BURNS, *Examiner.*

M. W. COOK, R. D. WHITE, *Assistant Examiners.*